United States Patent
Kwon

(10) Patent No.: US 9,580,116 B1
(45) Date of Patent: Feb. 28, 2017

(54) TILT LOCKING APPARATUS FOR TRUCK CAP

(71) Applicant: Hyundai Motor Company, Seoul (KR)

(72) Inventor: Jin Young Kwon, Daegu (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/989,482

(22) Filed: Jan. 6, 2016

(30) Foreign Application Priority Data

Sep. 24, 2015 (KR) .................. 10-2015-0135812

(51) Int. Cl.
*B60P 3/345* (2006.01)
*B62D 33/07* (2006.01)

(52) U.S. Cl.
CPC .................... *B62D 33/07* (2013.01)

(58) Field of Classification Search
CPC ........ B62D 1/184; B62D 1/183; B62D 1/187; A47C 1/03255; A47C 3/30; G06F 1/1632; Y10T 292/1047; B60P 7/13; E05B 15/0093
USPC ................. 296/164, 190.01, 190.05, 190.06; 180/89.14
See application file for complete search history.

(56) References Cited

U.S. PATENT DOCUMENTS

| 2,210,519 | A | * | 8/1940 | Wollensak | B62D 33/067 180/89.15 |
| 2,864,121 | A | * | 12/1958 | Imber | B62D 33/07 16/308 |
| 2,951,548 | A | * | 9/1960 | Crockett | B62D 33/067 180/89.14 |
| 3,039,557 | A | * | 6/1962 | Boyce | B62D 33/067 16/289 |
| 3,380,773 | A | * | 4/1968 | Sewelin | B62D 33/067 180/89.14 |
| 3,390,734 | A | * | 7/1968 | Sheerin | B62D 33/073 180/328 |
| 3,642,316 | A | * | 2/1972 | Porth | B62D 33/07 180/89.15 |
| 3,649,066 | A | * | 3/1972 | Steiner | B62D 33/07 180/89.15 |
| 3,801,151 | A | * | 4/1974 | Reynolds | B62D 33/07 180/89.15 |

(Continued)

FOREIGN PATENT DOCUMENTS

| JP | H07-137662 A | 5/1995 |
| JP | 2002-129799 A | 5/2002 |

(Continued)

*Primary Examiner* — Kiran B Patel
(74) *Attorney, Agent, or Firm* — Mintz Levin Cohn Ferris Glovsky and Popeo, P.C.; Peter F. Corless

(57) ABSTRACT

A tilt locking apparatus for a truck cap is provided. The tilt locking apparatus includes a locking hook that is installed below the truck cap and a tilting lever that is installed under a lower portion of the truck cap to be rotatable. A hook lever is installed adjacent to the locking hook to be rotatable forward and rearward and is configured to rotate interlocking with the tilting lever to selectively lock or from the hook lever to or from the locking hook. A manipulation lever is installed adjacent to the tilting lever and forms a latch lever. The manipulation lever is configured to sequentially restrict rotation of the tilting lever and rotates so that when the tilting lever is sequentially released from the latch lever, the hook lever is removed from the locking hook.

10 Claims, 10 Drawing Sheets

(56) References Cited

U.S. PATENT DOCUMENTS

| | | | | |
|---|---|---|---|---|
| 3,819,225 A * | 6/1974 | Carlisle | B62D 33/08 | 180/89.14 |
| 3,831,999 A * | 8/1974 | Sonneborn | B62D 33/07 | 180/89.14 |
| 3,875,850 A * | 4/1975 | Reynolds | B62D 33/07 | 137/517 |
| 3,944,017 A * | 3/1976 | Foster | B62D 33/0608 | 180/89.15 |
| 3,948,341 A * | 4/1976 | Foster | B62D 33/07 | 180/89.15 |
| 3,958,659 A * | 5/1976 | Selman | B62D 33/07 | 108/7 |
| 4,206,826 A * | 6/1980 | McMillen | B60K 20/04 | 180/328 |
| 4,220,217 A * | 9/1980 | Kobayashi | B60K 20/04 | 180/328 |
| 4,366,879 A * | 1/1983 | Nordell | B62D 33/07 | 180/89.15 |
| 4,410,056 A * | 10/1983 | Pound | B62D 33/07 | 180/89.15 |
| 4,534,443 A * | 8/1985 | Hurst | B62D 33/073 | 180/328 |
| 4,556,118 A * | 12/1985 | London | B62D 33/07 | 180/89.15 |
| 4,739,854 A * | 4/1988 | Sabel | B62D 33/07 | 180/89.15 |
| 4,921,062 A * | 5/1990 | Marlowe | B62D 33/07 | 180/89.14 |
| 6,454,035 B1 * | 9/2002 | Waskow | B62D 33/067 | 180/69.21 |
| 6,637,531 B2 * | 10/2003 | Palenchar | B62D 25/10 | 180/69.21 |
| 2010/0127510 A1 * | 5/2010 | Okunaka | B62D 33/071 | 292/143 |
| 2011/0017536 A1 * | 1/2011 | Chunduru | B62D 33/067 | 180/89.14 |
| 2014/0103183 A1 * | 4/2014 | Lokhande | B62D 33/07 | 248/352 |
| 2014/0251711 A1 * | 9/2014 | Angelo | B62D 33/063 | 180/271 |

FOREIGN PATENT DOCUMENTS

| | | |
|---|---|---|
| KR | 2007-0032549 A | 3/2007 |
| KR | 10-0764958 B1 | 10/2007 |
| KR | 2009-01120451 A | 10/2009 |

* cited by examiner

TILT LOCKING APPARATUS FOR TRUCK CAP

CROSS REFERENCE TO RELATED APPLICATION

The present application claims priority to Korean Patent Application No. 10-2015-0135812, filed Sep. 24, 2015, the entire contents of which are incorporated herein for all purposes by this reference.

BACKGROUND

Field of the Invention

The present invention relates to tilt locking apparatuses for truck caps and, more particularly, to a tilt locking apparatus for a truck cap in which an unlocking operation is conducted sequentially when the truck cap is tilted, thus providing ease of use and ensuring user safety.

Description of the Related Art

Generally, a cap of a truck can be tilted to allow engine maintenance. The weights of the truck caps differ based on the size of the truck. Typically, a cap tilting system is used in trucks to lift such a truck cap which is heavy. Cap tilting systems are classified into a torsion bar type, a hydraulic type, etc. Furthermore, a locking apparatus is disposed in the truck cap to selectively restrict the tilting operation of the truck cap. The locking apparatus is operated by a user raising a handle for unlocking the cap locking apparatus and lifting the truck cap by a cap tilting handle.

The unlocking handle is, however, disposed on a vehicle panel at a side of the truck cap. Therefore, when the user is near the unlocking handle, there is the risk of injury to the user due to carelessness. Furthermore, the unlocking handle and the cap tilting handle are comparatively distant to each other, thus inconveniencing the user when simultaneously performing the unlocking operation and the cap tilting operation.

The foregoing is intended merely to aid in the understanding of the background of the present invention, and is not intended to mean that the present invention falls within the purview of the related art that is already known to those skilled in the art.

SUMMARY

Accordingly, the present invention provides a tilt locking apparatus for a truck cap in which an unlocking operation is performed sequentially when the truck cap is tilted, thus ensuring the safety of a user. Additionally, the present invention provides a tilt locking apparatus for a truck cap which has an improved configuration that facilitates the use of a handle for unlocking a tilt locked state, thus providing ease of use.

According to one aspect, a tilt locking apparatus for a truck cap may include: a locking hook installed below the truck cap; a tilting lever installed under a lower portion of the truck cap to be rotatable; a hook lever disposed adjacent to the locking hook and installed to be rotatable forward and rearward, the hook lever rotating to interlock with the tilting lever to selectively lock or remove the hook lever from the locking hook; and a manipulation lever installed adjacent to the tilting lever, the manipulation lever forming a latch lever, configured to sequentially restrict rotation of the tilting lever, and rotate to remove the hook lever from the locking hook when the tilting lever is sequentially released from the latch lever.

The tilting lever and the hook lever may be connected to each other by a linkage and thus, when the tilting lever is rotated, the hook lever may be rotated interlocking with the tilting lever. A first guide slot may be longitudinally formed in the tilting lever, and a second guide slot may be formed in a front-rear direction in the hook lever. A front end and a rear end of the linkage may be respectively slidably connected to the first guide slot and the second guide slot. The first guide slot of the tilting lever linearly may extend a predetermined length and a rear end of the first guide slot may be bent upward by a predetermined angle, and a locking depression that extends downward may be formed at a bending point at which the first guide slot is bent.

The hook lever may be rotatably installed above the locking hook and extend toward a front end of the locking hook, with a hook part that extends from an extended end of the hook lever rearward toward the locking hook. The second guide slot may be formed in the front-rear direction in the hook part of the hook lever. The linkage may include hinge pins on the respective front and rear ends thereof to rotatably and slidably connect the linkage to the first guide slot and the second guide slot, wherein the linkage may be bent downward between the front and rear ends thereof.

The latch lever may be rotatably installed below the tilting lever, and the manipulation lever may be coupled to the latch lever and thus, when the manipulation lever is rotated, the latch lever may be rotated in a direction equal to a direction in which the manipulation lever is rotated. A locking pin may protrude from a side surface of the tilting lever, and a plurality of locking depressions may be formed in the latch lever and thus, when the latch lever is rotated by the manipulation lever, the locking pin may be inserted into and locked to any one of the locking depressions. The locking depressions of the latch lever may include a first locking depression formed to a predetermined depth, and a second locking depression formed to a depth less than the depth of the first locking depression.

According to the tilt locking apparatus for truck caps having the above-mentioned configuration, the tilting lever and the manipulation lever which are provided to enable the truck cap to be tilted may be disposed adjacent to each other, thus providing ease of use. Furthermore, the unlocking operation may be sequentially performed, whereby the safety of the user may be ensured during the unlocking operation.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
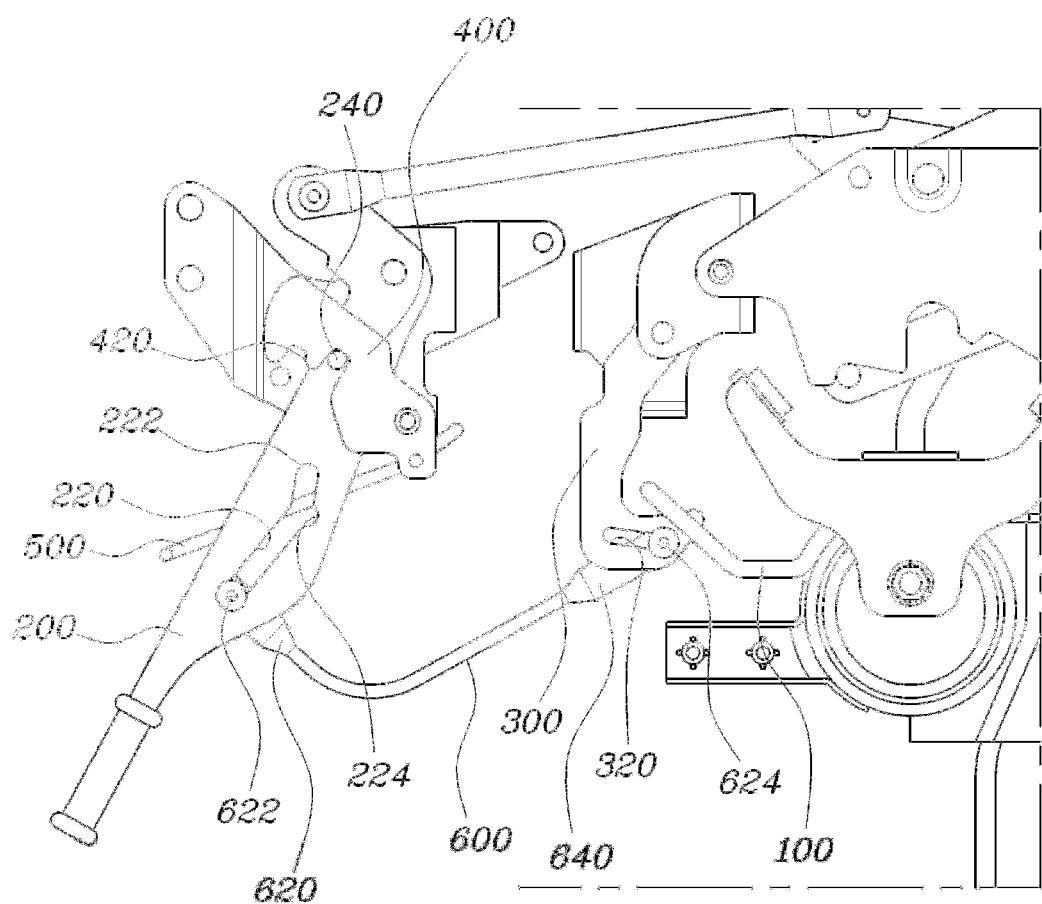
FIG. 1 is a view showing a tilt locking apparatus for a truck cap according to an exemplary embodiment of the present invention.
Figure 2:
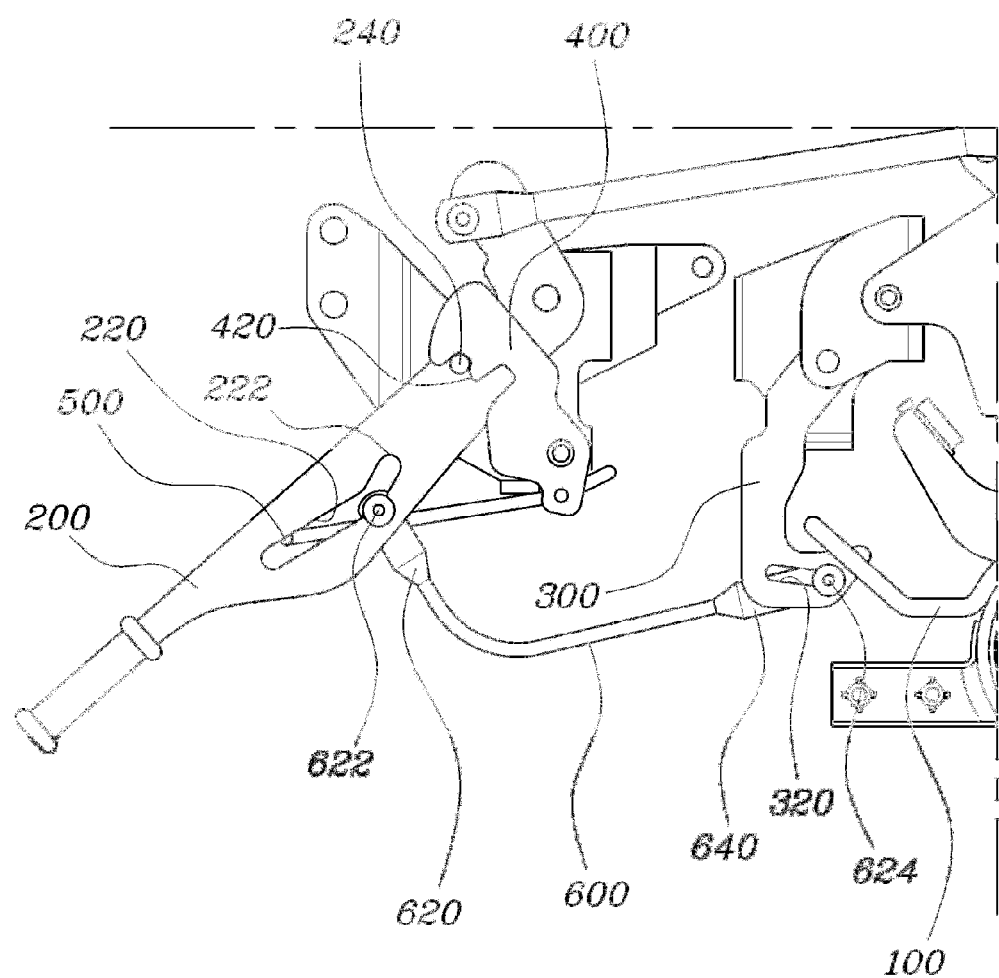
FIG. 2 is a view showing the operation of the tilt locking apparatus of FIG. 1 according to an exemplary embodiment of the present invention.

Hereinafter, a tilt locking apparatus for a truck cap according to an exemplary embodiment of the present invention will be described in detail with reference to the attached drawings. FIG. 1 is a view showing a tilt locking apparatus for a truck cap according to an exemplary embodiment of the present invention. FIG. 2 is a view showing the operation of the tilt locking apparatus of FIG. 1. FIGS. 3 to 10 are views illustrating the tilt locking apparatus according to an exemplary embodiment of the present invention.

As shown in FIGS. 1 and 2, the tilt locking apparatus for the truck cap according to the exemplary embodiment of the present invention may include: a locking hook 100, a tilting lever 200, a hook lever 300, and a manipulation lever 500. In particular, the locking hook 100 may be installed below the truck cap 10. The tilting lever 200 may be installed under a lower portion of the truck cap 10 to be rotatable. The hook lever 300 may be disposed adjacent to the locking hook 100 and installed to be rotatable forward and rearward. The hook lever 300 may be configured to rotate interlocking with the tilting lever 200 to selectively lock or remove the hook lever 300 from the locking hook 100. The manipulation lever 500 may be installed adjacent to the tilting lever 200 and may form a latch lever 400, configured to sequentially restrict rotation of the tilting lever 200, and thus, when the tilting lever 200 is sequentially released from the latch lever 400, the hook lever 300 may be removed from the locking hook 100.

Moreover, the present invention relates to a tilt locking apparatus which allows or restricts the operation of tilting the truck cap 10 and may include the locking hook 100, the tilting lever 200, the hook lever 300, the latch lever 400, and the manipulation lever 500. Other subsidiary elements are well-known techniques; therefore, further explanation thereof will be omitted. In other words, the present invention embodies a technique which allows the truck cap 10 to be tilted after a stepwise procedure is performed to release a locked state of the truck cap 10. Based on this, the present invention will be described in detail below.

The locking hook 100 may be fixed to a vehicle body panel below the truck cap 10. When the hook lever 300 rotatably installed adjacent to the locking hook 100 is rotated, the hook lever 300 may be selectively locked to or removed from the locking hook 100, whereby the operation of tilting the truck cap 10 may be allowed or restricted. In particular, the hook lever 300 may be configured to rotate interlocking with the tilting lever 200. The tilting lever 200 may be rotated after at least two steps of unlocking operations are performed with the manipulation lever 500 and the latch lever 400. When the tilting lever 200 is rotated, the hook lever 300 may be removed from the locking hook 100, thus allowing the tilting operation of the truck cap 10. Accordingly, in the present invention, with regard to releasing the locked state of the tilting operation, the tilting operation of the truck cap 10 may be allowed after two steps of unlocking operations are performed. Thereby, the safety of a user may be ensured.

The present invention will be described in more detail. As shown in FIG. 1, the tilting lever 200 and the hook lever 300 may be connected to each other by a linkage 600 and thus, when the tilting lever 200 is rotated, the hook lever 300 may be rotated interlocking the tilting lever 200. In other words, when the tilting lever 200 is rotated forward, the linkage 600 may be pulled and moved forward. Then, the hook lever 300 connected to the linkage 600 may also be rotated forward (e.g., in the same direction as the tilting lever 200).

As shown in FIG. 1, a first guide slot 220 may be formed longitudinally in the tilting lever 200. A second guide slot 320 may be formed in a front-rear direction in the hook lever 300. A front end 620 and a rear end 640 of the linkage 600 may be respectively slidably connected to the first guide slot 220 and the second guide slot 320. In particular, the rotation operation of the tilting lever 200 may be performed sequentially. In an initial rotation operation of the tilting lever 200, as the front end 620 of the linkage 600 moves along the first guide slot 220, the linkage 600 may not be moved forward (e.g., may be prevented from moving forward). When the tilting lever 200 is rotated to a predetermined angle, the front end 620 of the linkage 600 may be locked (e.g., fixed) to the first guide slot 220. When the tilting lever 200 is rotated, further the linkage 600 may be moved forward. Then, the rear end 640 of the linkage 600 may slide along the second guide slot 320 and may be locked to a front end of the second guide slot 320, thus moving the hook lever 300 forward and removing the hook lever 300 from the locking hook 100.

Accordingly, due to the first guide slot 220 formed in the tilting lever 200 and the second guide slot 320 formed in the hook lever 300, when the tilting lever 200 rotates, the rotation of the hook lever 300 may be allowed or restricted based on a rotation angle of the titling lever 200, rather than being rotated immediately when the tilting lever 200 rotates, thus making it possible to embody the stepwise (e.g., sequential) unlocking operation interlocking with the latch lever 400 and the manipulation lever 500 which will be explained in detail later herein.

Figure 5:
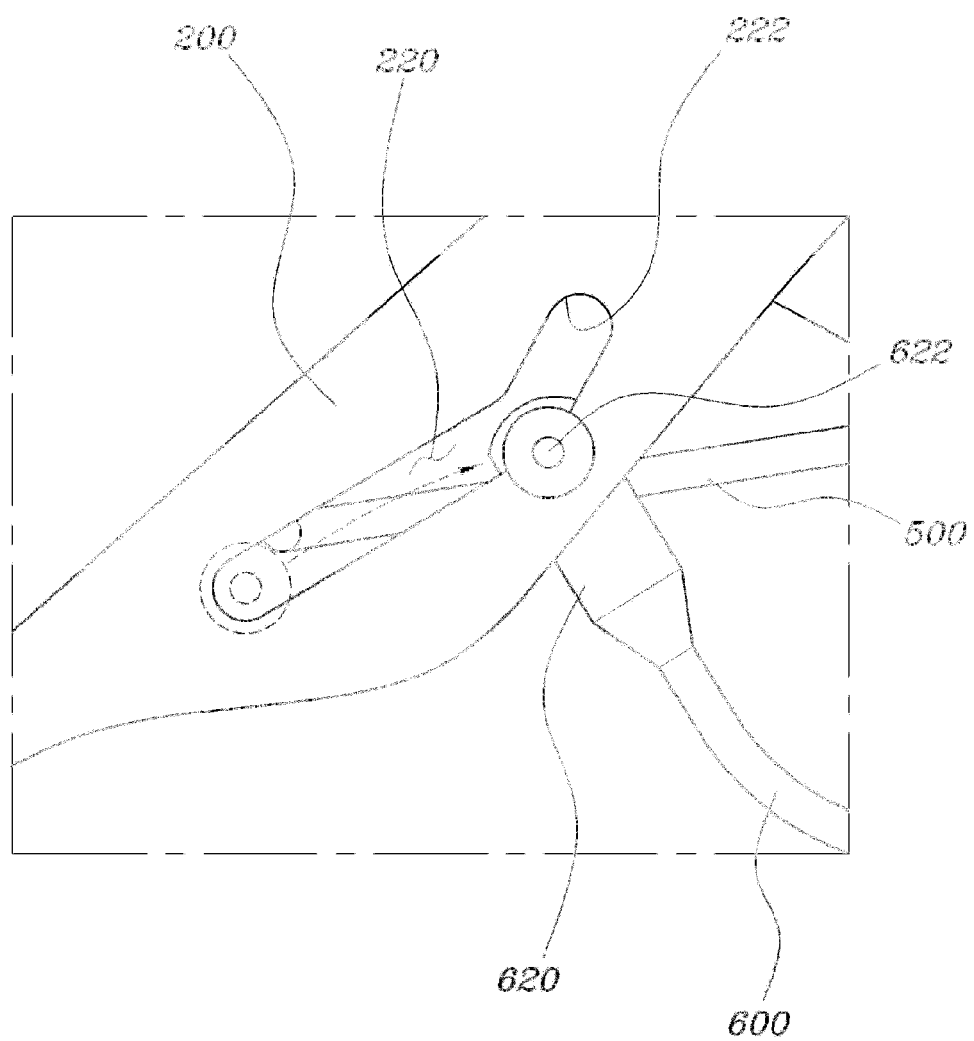

The first guide slot 220 of the tilting lever 200 may extend linearly at a predetermined length. A rear end 222 of the first guide slot 220 may be bent upward by a predetermined angle, and a locking depression 224 that extends downward is formed at a bending point at which the first guide slot 220 is bent. As shown in FIG. 5, since the first guide slot 220 of the tilting lever 200 is formed with the rear end 222 thereof bent upward, the front end 620 of the linkage 600 may move more smoothly along the first guide slot 220 with respect to the direction in which the tilting lever 200 is rotated. When the tilting lever 200 is completely rotated, the front end 620 of the linkage 600 may be locked to the rear end 222 of the first guide slot 220, and thus the operation of pulling the linkage 600 may be conducted more reliably.

Furthermore, the locking depression 224 that extends downward may be formed at the bending point of the first guide slot 220. Thus, the front end 620 of the linkage 600 may be selectively disposed in the locking depression 224 or the bent part of the rear end 222 of the first guide slot 220, whereby the unlocking operation may be performed in two steps. In other words, when the front end 620 of the linkage 600 is disposed in the locking depression 224 while the tilting lever 200 rotates indicates that a first unlocking operation has been conducted. When the tilting lever 200 is further rotated and thus the front end 620 of the linkage 600 is disposed in the bent part of the rear end 222 of the first guide slot 220 indicates that a second unlocking operation has been conducted.

Figure 6:
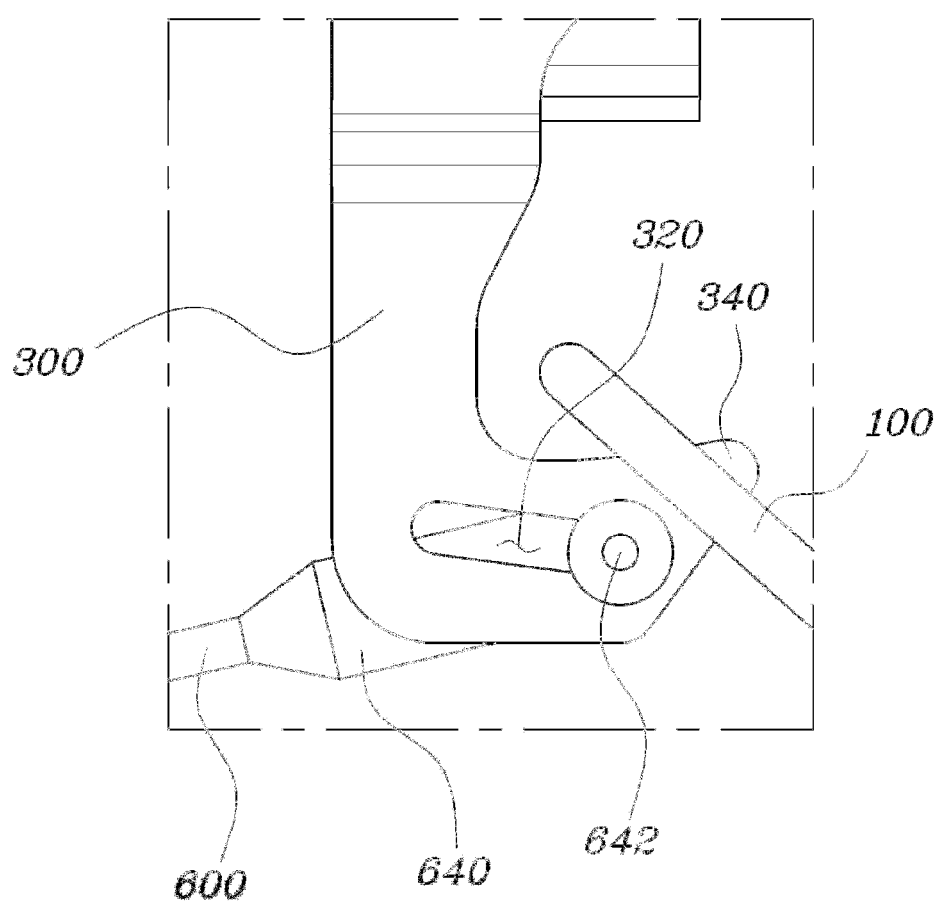

As shown in FIG. 6, the hook lever 300 may be rotatably installed above the locking hook 100 and may extend toward a front end of the locking hook 100. A hook part may extend from the extended end of the hook lever 300 rearward toward the locking hook 100. The second guide slot 320 may be formed in the front-rear direction in the hook part 340 of the hook lever 300. Accordingly, since the hook lever 300 may be rotatably installed above the locking hook 100 and the hook part 340 formed on the end of the hook lever 300 may be locked to a lower portion of the locking hook 100, the truck cap 10 may be restricted from being tilted upward.

Furthermore, the second guide slot 320 may be formed in the hook part 340 disposed on the end of the hook lever 300. Thus, as the tilting lever 200 is rotated, the linkage 600 may be configured to pull the end of the hook lever 300, and thus the hook lever 300 may be rotated more smoothly. Additionally, hinge pins 622 and 624 may be provided respectively on the front end 620 and the rear end 640 of the linkage 600. The linkage 600 may be rotatably and slidably connected to the first guide slot 220 and the second guide slot 320 by the hinge pins 622 and 624. The linkage 600 may be bent downward between the front end 620 and the rear end 640.

Accordingly, since the linkage 600 may be connected to the first guide slot 220 and the second guide slot 320 by the hinge pins 622 and 624 disposed on the front and rear ends 620 and 640 of the linkage 600, the linkage 600 may rotate and slide more smoothly in the first guide slot 220 and the second guide slot 320. Furthermore, due to the structure in which the linkage 600 is bent downward between the front end 620 and the rear end 640, when the tilting lever 200 is rotated, the front end 620 and the rear end 640 of the linkage 600 may be moved more smoothly along the first guide slot 220 and the second guide slot 320, respectively. In particular, the downward bent structure of the linkage 600 allows the hook lever 300 to be linearly moved by rotation of the tilting lever 200.

The latch lever 400 may be rotatably installed below a rotation center point of the tilting lever 200. The manipulation lever 500 may be coupled to the latch lever 400 and thus, when the manipulation lever 500 rotates, the latch lever 400 may be rotated in the same direction as that of the manipulation lever 500. A locking pin 240 may protrude from a side surface of the tilting lever 200. In addition, a plurality of locking depressions 420 may be formed in the latch lever 400 and thus, when the latch lever 400 is rotated by the manipulation lever 500, the locking pin 240 may be inserted into and locked to any one of the locking depressions 420.

In the structure of the tilting lever 200, as the locking pin 240 is locked to any one of the locking depressions 420 formed in the latch lever 400, the rotation of the tilting lever 200 may be restricted. In particular, since the plurality of locking depressions 420 may be formed in the latch lever 400, the stepwise (e.g., sequential) unlocking operation may be embodied as the locking pin 240 is inserted in steps into the locking depressions 420. The locking depressions 420 of the latch lever 400 may include a first locking depression 422 formed to a predetermined depth, and a second locking depression 424 formed to a depth less than that of the first locking depression 422.

In other words, the locking depressions 420 formed in the latch lever 400 may include the first locking depression 422 formed adjacent to the rotation center point of the latch lever 400, and the second locking depression 424 having a depth different from that of the fust locking depression 422 and formed at a position spaced apart from the first locking depression 422. Thus, during the operation of removing the locking pin 240 from the locking depressions 420, the locking pin 240 may be sequentially removed via the first locking depression 422 and the second locking depression 424.

Hereinbelow, the operation of the tilt locking apparatus for truck caps according to an exemplary embodiment of the present invention will be described. As shown in FIG. 1, at the initial stage in which the tilt of the truck cap 10 is in the locked state, the hook part 340 of the hook lever 300 may be locked to the locking hook 100. The locking pin 240 of the tilting lever 200 may be disposed in and locked to the first locking depression 422 of the latch lever 400.

Figure 3:
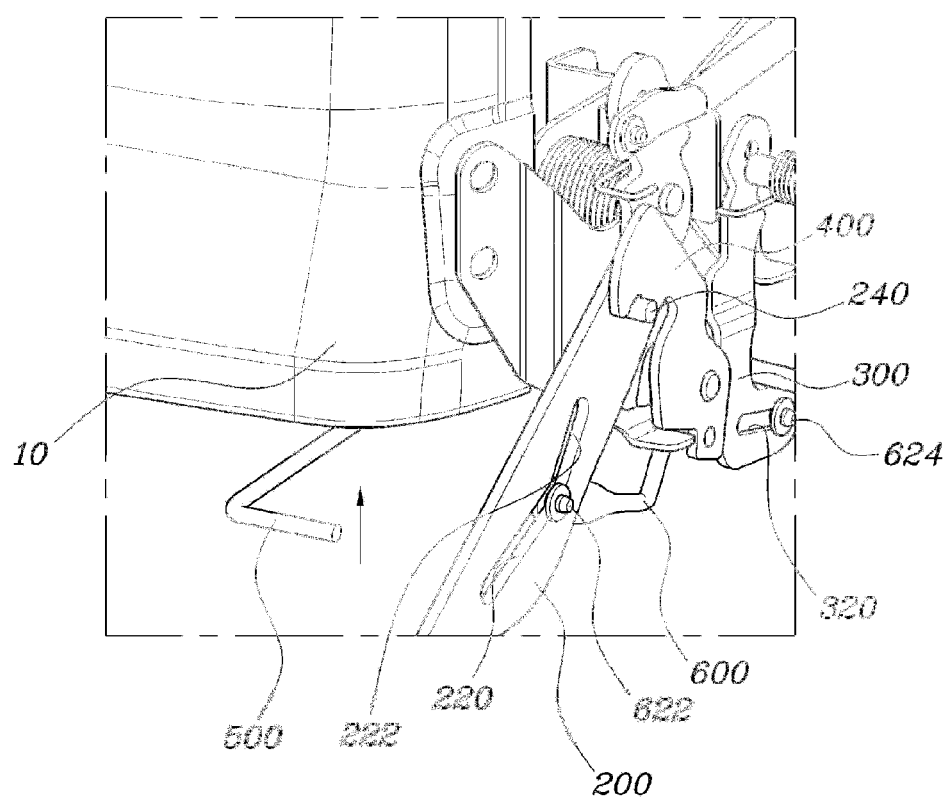
FIGS. 3 to 10 are views illustrating the tilt locking apparatus according to an exemplary embodiment the present invention.
Figure 4:
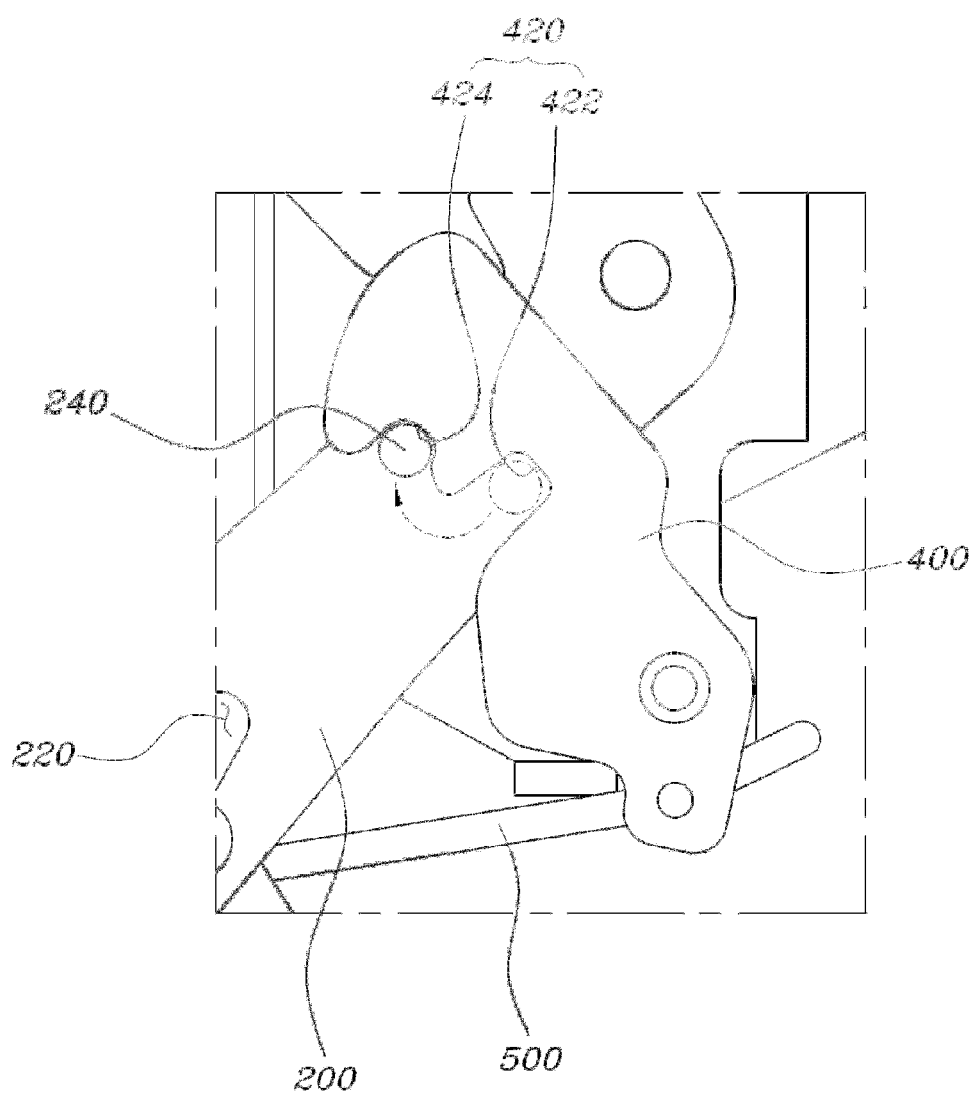

As shown in FIG. 3, to release the tilt locked state of the truck cap 10, when the manipulation lever 500 is rotated upward, the latch lever 400 may be rotated along with the manipulation lever 500. Then, the locking pin 240 may be removed from the first locking depression 422. In particular, when the tilting lever 200 is rotated, the locking pin 240 may be moved from the first locking depression 422 to the second locking depression 424. Simultaneously, the front end 620 of the linkage 600 connected to the first guide slot 220 of the tilting lever 200 may slide along the first guide slot 220 and enter the locking depression 224. The first unlocking operation may accordingly be performed. During the first unlocking operation, although the tilting lever 200 may be rotated by a predetermined angle, the locking pin 240 may be inserted into the second locking depression 424 of the latch lever 400. In addition, as the front end 620 of the linkage 600 slides along the first guide slot 220, the movement of the linkage 600 may be absorbed. Thus, as shown in FIG. 6, the hook lever 300 may be maintained in a locked state to the locking hook 100.

Figure 7:
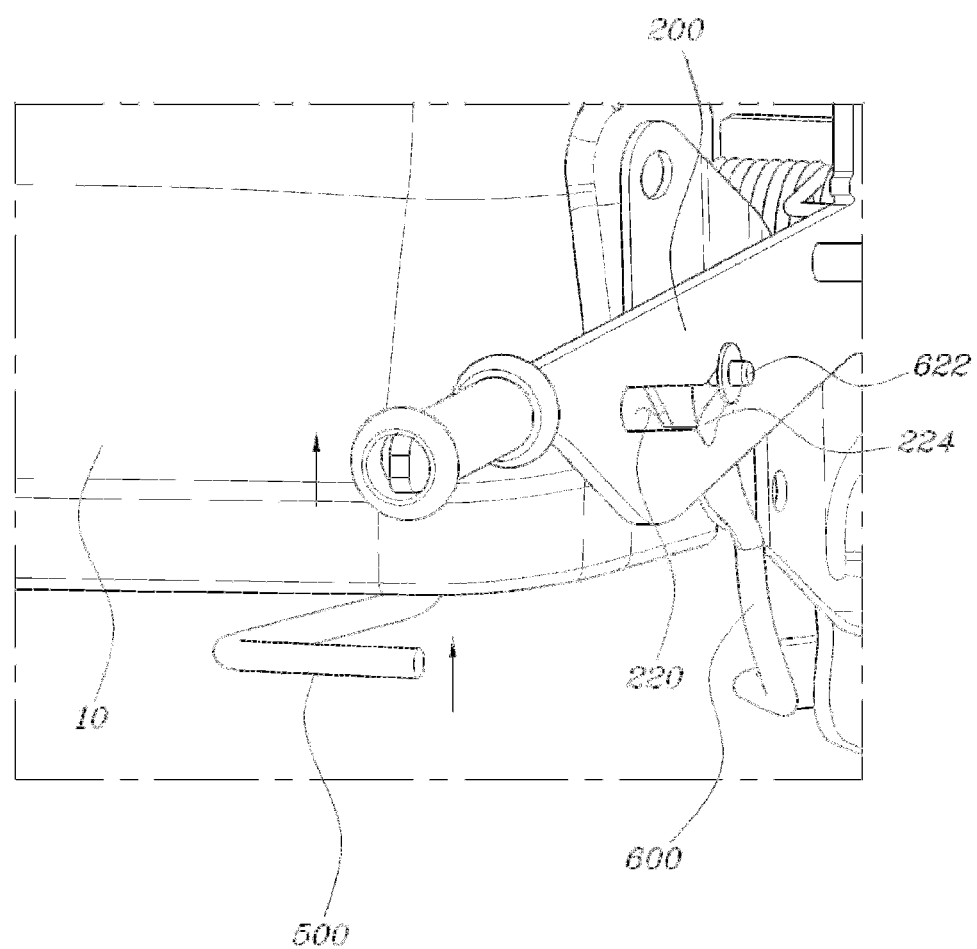
Figure 8:
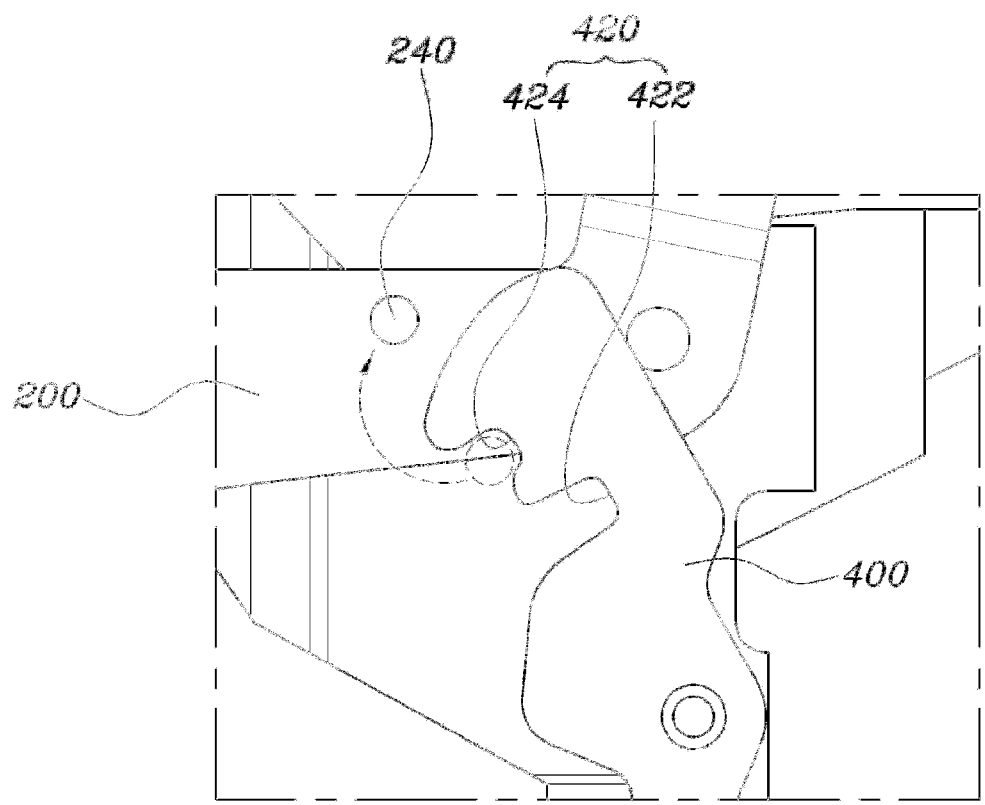
Figure 9:
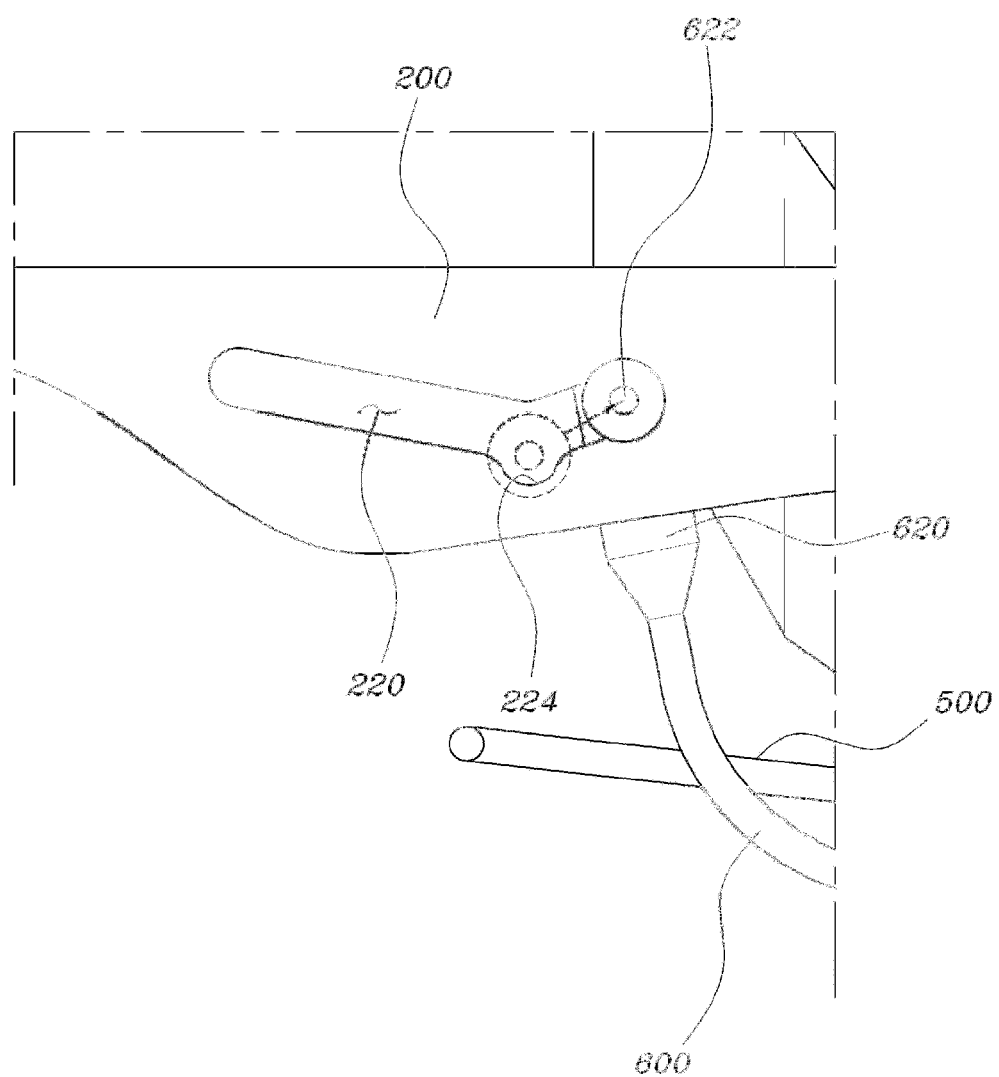
Figure 10:
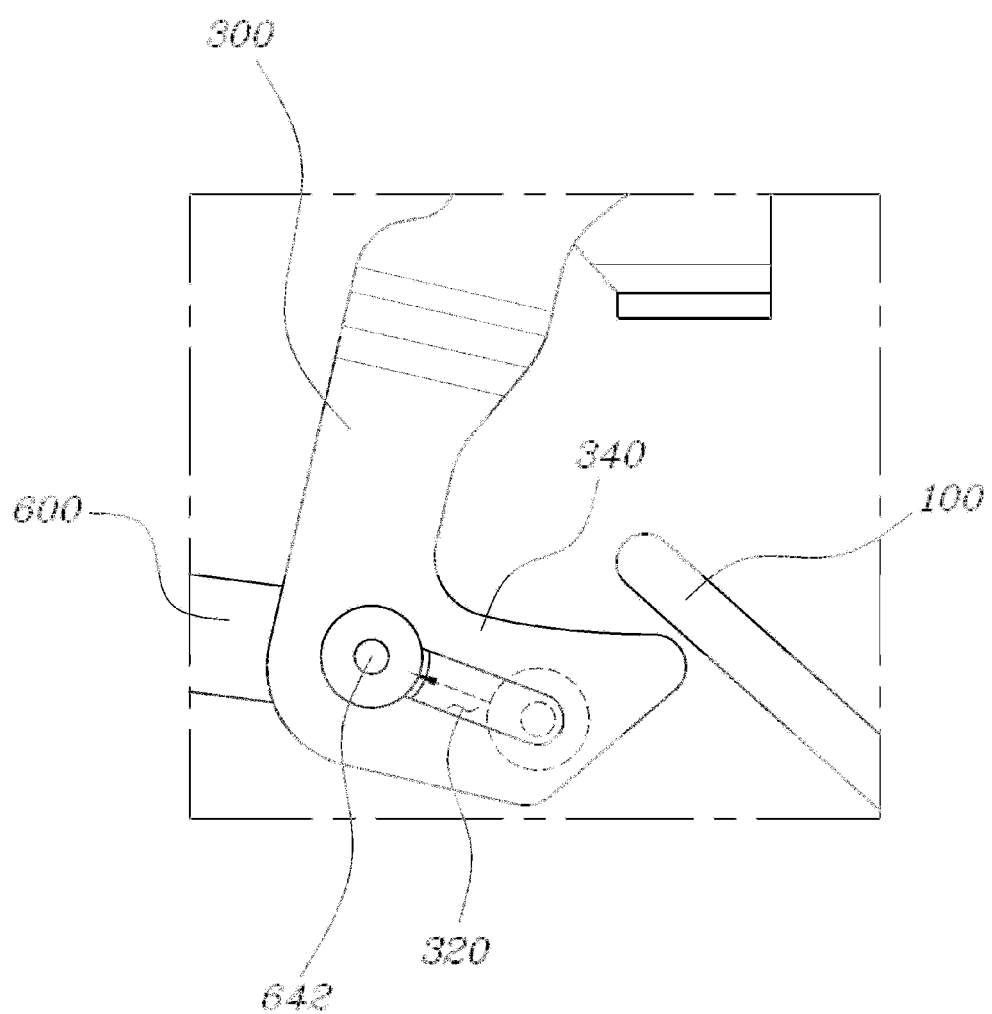

After the first unlocking operation has been performed, as shown in FIG. 7, when the manipulation lever 500 is moved further upward, the locking pin 240 may be removed from the second locking depression 424 of the latch lever 400, as shown in FIG. 8. Then, the rotation of the tilting lever 200 may be allowed or permitted, and the tilting lever 200 may be completely rotated upward. In particular, as shown in FIG. 9, the front end 620 of the linkage 600 connected to the first guide slot 220 of the tilting lever 200 may be ejected (e.g., come out from, release from, removed from, etc.) from the locking depression 224 and may be moved to and locked to the rear end 222 of the first guide slot 220. Therefore, the linkage 600 may be pulled and moved forward by the rotation of the tilting lever 200. As shown in FIG. 10, the rear end 640 of the linkage 600 may move along the second guide slot 320 of the hook lever 300 and may be configured to pull the hook lever 300 forward. As a result, the hook lever 300 may be removed from the locking hook 100. Ultimately, the rotation of the tilting cap may be allowed. Furthermore, when the hook lever 300 is removed from the locking hook 100, the operation of tilting the tilting cap by pulling the tilting lever 200 upward may be allowed thus enhancing the operation convenience for users.

According to the tilt locking apparatus for truck caps having the above-mentioned configuration, the tilting lever 200 and the manipulation lever 500 provided to enable the truck cap to be tilted may be disposed adjacent to each other, thus providing ease of use. Furthermore, the unlocking operation may be performed sequentially, whereby the safety of the user may be ensured during the unlocking operation.

Although the exemplary embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A tilt locking apparatus for a truck cap, comprising:
   a locking hook installed below the truck cap;
   a tilting lever installed under a lower portion of the truck cap so be rotatable;
   a hook lever disposed adjacent to the locking hook and installed to be rotatable forward and rearward, wherein the hook lever is configured to rotate interlocking with the tilting lever to selectively lock to or be removed from the locking hook; and
   a manipulation lever installed adjacent to the tilting lever, the manipulation lever forming a latch lever, configured to sequentially restrict rotation of the tilting lever, rotate and when the tilting lever is sequentially released from the latch lever, the hook lever is removed from the locking hook.

2. The tilt locking apparatus according to claim 1, wherein the tilting lever and the hook lever are connected to each other by a linkage and when the tilting lever is rotated, the hook lever is rotated interlocking with the tilting lever.

3. The tilt locking apparatus according to claim 2, wherein a first guide slot is formed longitudinally in the tilting lever, and a second guide slot is formed in a front-rear direction in the hook lever, wherein a front end and a rear end of the linkage are respectively slidably connected to the first guide slot and the second guide slot.

4. The tilt locking apparatus according to claim 3, wherein the first guide slot of the tilting lever extends linearly at a predetermined length, wherein a rear end of the first guide slot is bent upward by a predetermined angle, and a locking depression that extends downward is formed at a bending point at which the first guide slot is bent.

5. The tilt locking apparatus according to claim 3, wherein the hook lever is rotatably installed above the locking hook and extends toward a front end of the locking hook, with a hook part that extends from an extended end of the hook lever rearward toward the locking hook.

6. The tilt locking apparatus according to claim 5, wherein the second guide slot is formed in the front-rear direction in the hook part of the hook lever.

7. The tilt locking apparatus according to claim 3, wherein the linkage includes hinge pins on the respective front and rear ends thereof, wherein the linkage is rotatably and slidably connected to the first guide slot and the second guide slot, and the linkage is bent downward between the front and rear ends thereof.

8. The tilt locking apparatus according to claim 1, wherein the latch lever is rotatably installed below the tilting lever, and the manipulation lever is coupled to the latch lever and when the manipulation lever is rotated, the latch lever is rotated in a direction equal to a direction in which the manipulation lever is rotated.

9. The tilt locking apparatus according to claim 1, wherein a locking pin protrudes from a side surface of the tilting lever, and a plurality of locking depressions are formed in the latch lever and when the latch lever is rotated by the manipulation lever, the locking pin is inserted into and locked to any one of the locking depressions.

10. The tilt locking apparatus according to claim 9, wherein the locking depressions of the latch lever include a first locking depression formed to a predetermined depth, and a second locking depression formed to a depth less than the depth of the first locking depression.

* * * * *